(12) United States Patent
Ohiwane et al.

(10) Patent No.: US 6,366,560 B1
(45) Date of Patent: Apr. 2, 2002

(54) ROUTE SELECTION SERVICE CONTROL SYSTEM

(75) Inventors: Hiroshi Ohiwane; Hidehiko Fujimoto, both of Fukuoka; Hirokazu Kumano, Dazaifu; Kouji Kabatani, Fukuoka, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/137,336

(22) Filed: Aug. 20, 1998

(30) Foreign Application Priority Data

Mar. 20, 1998 (JP) .......................................... 10-071526

(51) Int. Cl.$^7$ .............................................. H04L 12/26
(52) U.S. Cl. .................... 370/238; 379/114.02
(58) Field of Search .............................. 370/238, 351, 370/400, 465; 379/114.02, 121.02, 127.05

(56) References Cited

U.S. PATENT DOCUMENTS

| | | | | |
|---|---|---|---|---|
| 5,715,304 A | * | 2/1998 | Nishida et al. | 379/114.02 |
| 6,078,652 A | * | 6/2000 | Barak | 379/114.02 |
| 6,104,701 A | * | 8/2000 | Avargues et al. | 370/238 |
| 6,169,791 B1 | * | 1/2001 | Pokress | 379/114.02 |

\* cited by examiner

*Primary Examiner*—Chau Nguyen
*Assistant Examiner*—D. Trinh
(74) *Attorney, Agent, or Firm*—Rosenman & Colin LLP

(57) ABSTRACT

A route selection service control system for selecting an optimum one of routes connecting an originating-side terminal to each of terminals owned by an identical subscriber and connected to respective communication networks operated by different telecommunication carriers. On receiving the identification number of a terminating-side subscriber, a reading unit refers to terminal type storing unit and reads out the terminal types and terminal numbers of a plurality of terminating-side terminals associated with the identification number. A position information acquiring unit acquires the current positions of the terminating-side terminals. A distance calculating unit calculates the distance between the position of an originating-side terminal and the current position of each of the terminating-side terminals. A unit charge extracting device refers to a unit charge storing device and extracts, with respect to each of the terminating-side terminals, a unit charge applicable to the originating-side terminal type, to the terminating-side terminal type, and to the distance. A selecting/notifying unit selects a terminating-side terminal which shows a minimum value among the extracted unit charges and notifies an originating-side communication network of the selected terminal.

6 Claims, 16 Drawing Sheets

UNIT CHARGE LIST USED WHERE ORIGINATING SIDE IS PHS TERMINAL

| DISTANCE / TIME ZONE / TERMINATING-SIDE TERMINAL TYPE | INSIDE AREA | | | OUTSIDE AREA A | | | OUTSIDE AREA B | | |
|---|---|---|---|---|---|---|---|---|---|
| | WEEKDAY DAYTIME | NIGHT-TIME HOLIDAY | LATE-NIGHT EARLY-MORNING | WEEKDAY DAYTIME | NIGHT-TIME HOLIDAY | LATE-NIGHT EARLY-MORNING | WEEKDAY DAYTIME | NIGHT-TIME HOLIDAY | LATE-NIGHT EARLY-MORNING |
| REGULAR TERMINAL | 30 | 20 | 10 | 60 | 50 | 40 | 90 | 80 | 70 |
| DIFFERENT CARRIER'S TERMINAL | 30 | 20 | 10 | 60 | 50 | 40 | 90 | 80 | 70 |
| PHS TERMINAL | 30 | 30 | 30 | 40 | 40 | 40 | 50 | 50 | 50 |
| PORTABLE TERMINAL | 200 | 200 | 200 | 200 | 200 | 200 | 200 | 200 | 200 |

FIG. 7

UNIT CHARGE LIST USED WHERE ORIGINATING SIDE IS PORTABLE TERMINAL

| DISTANCE / TIME ZONE<br>TERMINATING-SIDE TERMINAL TYPE | INSIDE AREA | | | INSIDE AREA | | | OUTSIDE AREA B | | |
|---|---|---|---|---|---|---|---|---|---|
| | WEEKDAY DAYTIME | NIGHT-TIME HOLIDAY | LATE-NIGHT EARLY-MORNING | WEEKDAY DAYTIME | NIGHT-TIME HOLIDAY | LATE-NIGHT EARLY-MORNING | WEEKDAY DAYTIME | NIGHT-TIME HOLIDAY | LATE-NIGHT EARLY-MORNING |
| REGULAR TERMINAL | 30 | 20 | 10 | 60 | 50 | 40 | 90 | 80 | 70 |
| DIFFERENT CARRIER'S TERMINAL | 30 | 20 | 10 | 60 | 50 | 40 | 90 | 80 | 70 |
| PHS TERMINAL | 200 | 200 | 200 | 200 | 200 | 200 | 200 | 200 | 200 |
| PORTABLE TERMINAL | 40 | 40 | 40 | 50 | 50 | 50 | 60 | 60 | 60 |

FIG. 8

ROUTE SELECTION SERVICE CONTROL SYSTEM

BACKGROUND OF THE INVENTION (1) Field of the Invention

The present invention relates to a route selection service control system, and more particularly, to a route selection service control system provided in a common communication network, to which are connected communication networks operated by a plurality of telecommunication carriers adopting different call charging systems, for selecting a specific route from among routes connecting an originating-side terminal to each of terminals owned by an identical subscriber and connected to respective communication networks operated by different carriers.

(2) Description of the Related Art

In recent years, with rapid spread of mobile communications and an increasing number of telecommunication (network) carriers entering the market, more and more personal subscribers have come to own a plurality of terminals serviced by different carriers.

Conventional communication networks include, besides regular point-to-point communication networks, mobile communication networks which include those for PHS (Personal Handyphone System) and portable telephones. Not only the regular point-to-point communication networks but the mobile communication networks are operated by respective different telecommunication carriers and are connected to a common communication network so that terminals serviced by different carriers can be connected to each other via the common communication network.

If a personal subscriber, who owns a plurality of terminals connected to respective communication networks serviced by different carriers, for example, a regular fixed telephone and a PHS telephone, currently stays near the fixed telephone while taking the PHS terminal with him or her, a person who wishes to telephone this subscriber may make a connection request (call) to either the fixed telephone or the PHS telephone.

Meanwhile, telecommunication carriers adopt a diversity of charging systems for calls, including the settings of call distances and applicable time zones.

Accordingly, even if a call is made under the same conditions, the call is charged differently depending on which of terminating-side terminals an originating-side terminal is connected to, or in other words, depending on which of routes is selected.

It is, however, difficult hitherto to determine to which of a plurality of terminating-side terminals owned by a single person an originating-side terminal should be connected to establish a call at the least cost.

SUMMARY OF THE INVENTION

An object of the present invention is to provide a route selection service control system which permits an optimum route to be selected from among routes connecting an originating-side terminal to each of terminals owned by an identical subscriber and connected to respective communication networks serviced by different telecommunication carriers.

To achieve the above object, there is provided a route selection service control system provided in a common communication network to which are connected communication networks operated by a plurality of telecommunication carriers adopting different call charging systems, for selecting a specific route from among routes connecting an originating-side terminal to each of terminals owned by an identical subscriber and connected to respective communication networks operated by different carriers. The route selection service control system comprises terminal type storing means for storing an identification number of a subscriber and terminal types and terminal numbers of a plurality of terminals owned by the subscriber in a manner associated with one another, unit charge storing means for storing, with respect to each terminal type of originating side, unit charges applicable to different terminal types of terminating side and to different distances between terminals of originating and terminating sides, reading means for receiving an identification number of a terminating-side subscriber from an originating-side terminal, and reading out the terminal types and terminal numbers of a plurality of terminating-side terminals associated with the identification number of the subscriber by referring to the terminal type storing means, position information acquiring means which, if the terminating-side terminals read out by the reading means include a mobile communication terminal, makes an inquiry to a position information management section associated with the terminal to obtain a current position of the terminal, distance calculating means for calculating a distance between the current position of the terminating-side terminal obtained by the position information acquiring means and the position of the originating-side terminal, unit charge extracting means for referring to the unit charge storing means to extract, with respect to each of the terminating-side terminals, a unit charge applicable to the terminal type of originating side, to the terminal type of terminating side read out by the reading means, and to the distance calculated by the distance calculating means, and selecting/notifying means for selecting a terminating-side terminal which shows a minimum value among the unit charges extracted by the unit charge extracting means and associated with the respective terminating-side terminals, and notifying an originating-side communication network of the terminal number of the selected terminal.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 is a chart showing an example of a unit charge list which is part of data stored in a unit charge data section and is used when the originating side is a PHS terminal;

FIG. 8 is a chart showing an example of a unit charge list which is part of data stored in the unit charge data section and is used when the originating side is a portable terminal;

DESCRIPTION OF THE PREFERRED EMBODIMENTS

Embodiments of the present invention will be hereinafter described with reference to the drawings.

Figure 1:
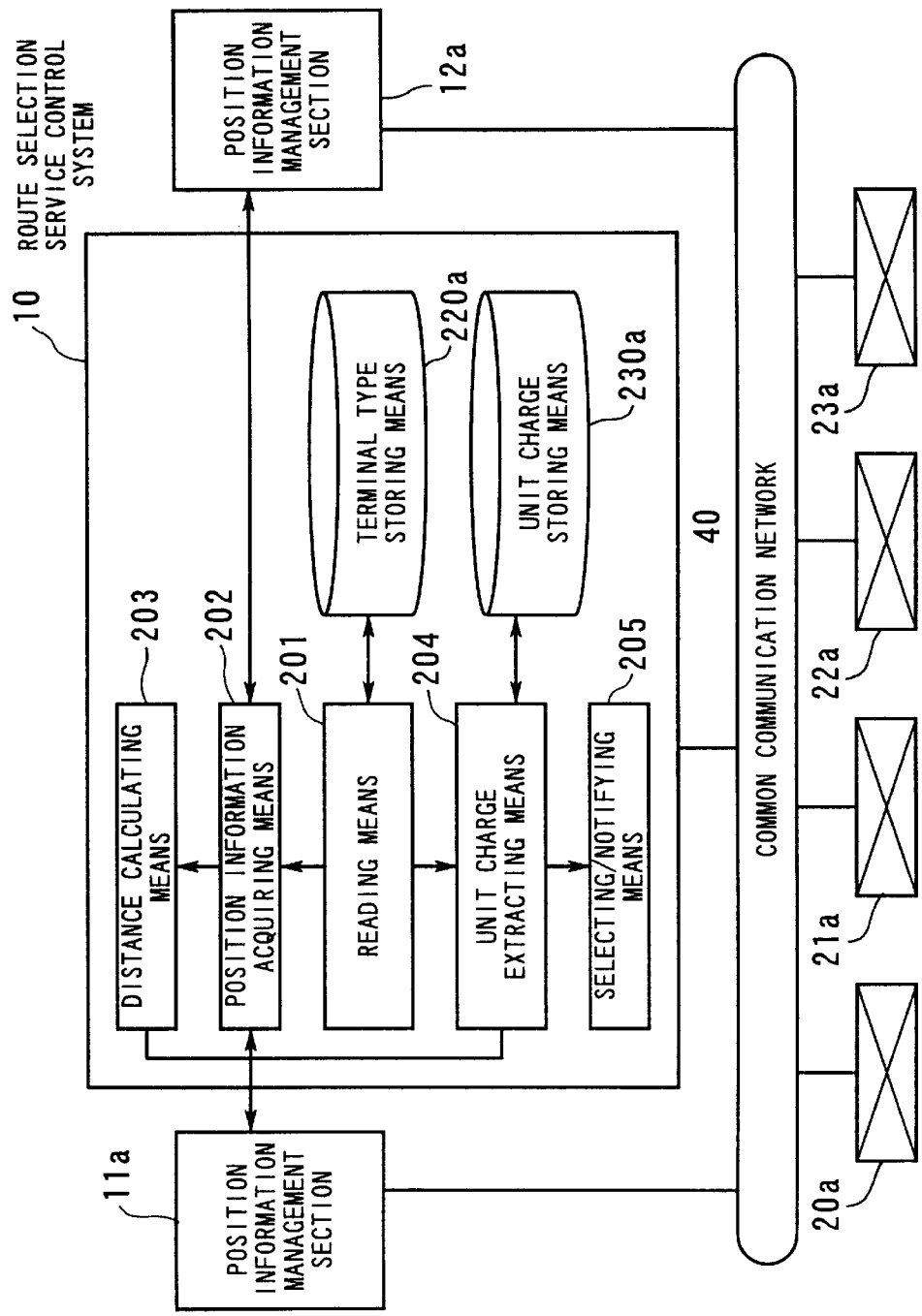
FIG. 1 is a diagram illustrating the principles of the present invention.

Referring first to FIG. 1, a theoretical configuration of a route selection service control system according to a first embodiment of the present invention will be explained. The first embodiment comprises terminal type storing means 220a for storing an identification number of a subscriber and terminal types and terminal numbers of a plurality of terminals owned by the subscriber in a manner associated with one another, unit charge storing means 230a for storing, with respect to each terminal type of originating side, unit charges applicable to different terminal types of terminating side and to different distances between terminals of originating and terminating sides, reading means 201 for receiving an identification number of a terminating-side subscriber from an originating-side terminal, and reading out the terminal types and terminal numbers of a plurality of terminating-side terminals associated with the identification number of the subscriber by referring to the terminal type storing means 220a, position information acquiring means 202 which, if the terminating-side terminals read out by the reading means 201 include a mobile communication terminal, makes an inquiry to a position information management section 11a (or 12a) associated with the terminal to obtain a current position of the terminal, distance calculating means 203 for calculating a distance between the current position of the terminating-side terminal obtained by the position information acquiring means 202 and the position of the originating-side terminal, unit charge extracting means 204 for referring to the unit charge storing means 230a to extract, with respect to each of the terminating-side terminals, a unit charge applicable to the terminal type of originating side, to the terminal type of terminating side read out by the reading means 201, and to the distance calculated by the distance calculating means 203, and selecting/notifying means 205 for selecting a terminating-side terminal which shows a minimum value among the unit charges extracted by the unit charge extracting means 204 and associated with the respective terminating-side terminals, and notifying an originating-side communication network of the terminal number of the selected terminal.

In the configuration described above, where a personal subscriber owns a plurality of terminals connected to respective communication networks serviced by different telecommunication carriers, an identification number of the subscriber and terminal types and terminal numbers of the subscriber's terminals are stored beforehand in the terminal type storing means 220a in a manner associated with one another. Also, with respect to each terminal type of originating side, unit charges applicable to different terminal types of terminating side and to different distances between terminals of originating and terminating sides are stored in the unit charge storing means 230a.

On receiving an identification number of a terminating-side subscriber from an originating-side terminal, the reading means 201 refers to the terminal type storing means 220a and reads out the terminal types and terminal numbers of terminals associated with the identification number of this subscriber. The information read out in this case comprises the terminal types and terminal numbers of the terminating-side terminals which may possibly include a mobile communication terminal.

If the terminating-side terminals read out by the reading means 201 include a mobile communication terminal, the position information acquiring means 202 makes an inquiry to the position information management section 11a (or 12a) associated with the terminal in question to obtain a current position of the terminal. Each of the position information management sections 11a and 12a always retains information about the current positions of individual terminals connected to a mobile communication network associated therewith.

The distance calculating means 203 calculates the distance between the current position of the terminating-side terminal obtained by the position information acquiring means 202 and the position of the originating-side terminal. If the originating-side terminal is a mobile communication terminal, it is also necessary to obtain the current position of the originating-side terminal by making an inquiry to the position information management section 11a (or 12a) associated with the originating-side terminal.

Making reference to the unit charge storing means 230a, the unit charge extracting means 204 extracts, with respect to each of the terminating-side terminals, a unit charge applicable to the terminal type of originating side, to the terminal type of terminating side read out by the reading means 201, and to the distance calculated by the distance calculating means 203. The selecting/notifying means 205 compares the unit charges extracted by the unit charge extracting means 204 and associated with the respective terminating-side terminals, with one another, then selects a terminating-side terminal which shows a minimum value among the unit charges, and notifies an originating-side communication network of the terminal number of the selected terminal.

Thus, by establishing a connection between the originating-side terminal and the terminal of which the terminal number has been sent to the originating-side communication network, a call can be made at the least cost. Namely, an optimum route can be selected from among the routes connecting the originating-side terminal to each of the terminals of an identical subscriber which are connected to respective communication networks serviced by different carriers.

The first embodiment will be now described in more detail. In the following description of the first embodiment, the position information management section 11a shown in FIG. 1 corresponds to a portable service control node 11 in FIG. 2. Similarly, the position information management section 12a corresponds to a PHS service control node 12 in FIG. 2, a communication network 20a corresponds to a portable telephone service transfer node 20 in FIG. 2, a communication network 21a corresponds to a regular telephone service transfer node 21 in FIG. 2, a communication network 22a corresponds to a PHS telephone service transfer node 22 in FIG. 2, a communication network 23a corresponds to a different carrier's transfer node 23 in FIG. 2, the terminal type storing means 220a corresponds to a terminal type data section 220 in FIG. 3, and the unit charge storing means 230a corresponds to a unit charge data section 230 in FIG. 3.

Figure 2:
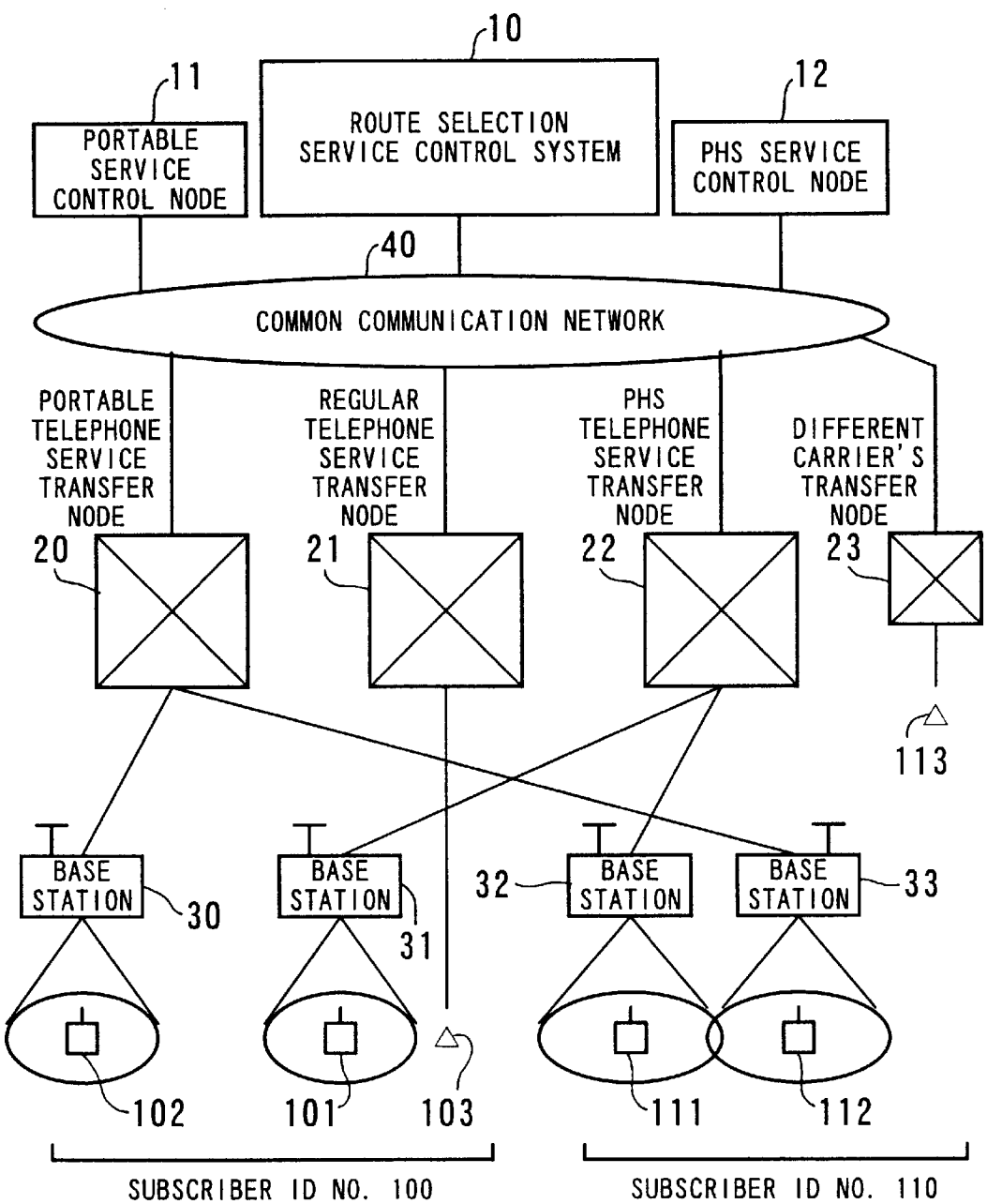
FIG. 2 is a diagram showing an entire communication network including a first embodiment.

FIG. 2 is a diagram showing an entire communication network including the first embodiment. To a common communication network 40 are connected the portable telephone service transfer node 20, the regular telephone service transfer node 21, the PHS telephone service transfer node 22, and the different carrier's transfer node 23. Base stations 30 and 33, for example, are connected to the portable telephone service transfer node 20, and mobile terminals 102 and 112 are located within radio service zones covered by the base stations 30 and 33, respectively. The portable telephone service transfer node 20, the base stations 30 and 33, the mobile terminals 102, 112, etc., constitute one communication network operated by a telecommunication carrier.

A fixed terminal 103, for example, is connected to the regular telephone service transfer node 21, and a communication network operated by another carrier is constituted by the regular telephone service transfer node 21, the fixed terminal 103, etc.

To the PHS telephone service transfer node 22 are connected base stations 31 and 32, for example, and mobile terminals 101 and 111 are located within radio service zones covered by the base stations 31 and 32, respectively. The PHS telephone service transfer node 22, the base stations 31 and 32, the mobile terminals 101, 111, etc., constitute still another communication network operated by a telecommunication carrier.

A fixed terminal 113, for example, is connected to the transfer node 23, and the transfer node 23, the fixed terminal 113, etc., constitute a further communication network operated by a different carrier.

Let it be assumed, for example, that a personal subscriber with the identification number "100" owns the mobile terminals 101 and 102 as well as the fixed terminal 103, and that another personal subscriber with the identification number "110" owns the mobile terminals 111 and 112 as well as the fixed terminal 113.

A route selection service control system 10 serves to automatically select a route that provides the least-cost call, from among the routes connecting an originating-side terminal to each of the terminals owned by an identical subscriber and connected to respective communication networks operated by different telecommunication carriers. The internal arrangement of the route selection service control system 10 will be described later with reference to FIG. 3.

The portable service control node 11 retains and manages information about subscribers and about subscribers' positions within the communication network constituted by the portable telephone service transfer node 20, the base stations 30 and 33, the mobile terminals 102, 112, etc.

The PHS service control node 12 retains and manages information about subscribers and about subscribers' positions within the communication network constituted by the PHS telephone service transfer node 22, the base stations 31 and 32, the mobile terminals 101, 111, etc.

Figure 3:
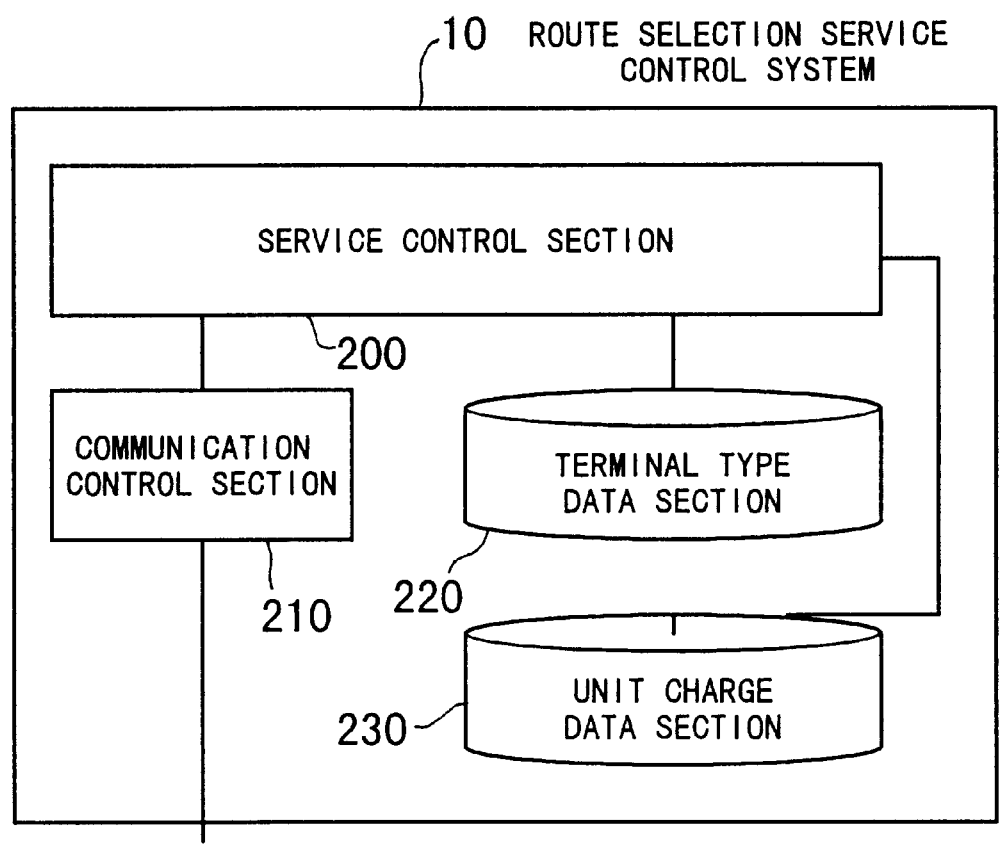
FIG. 3 is a diagram showing the internal arrangement of a route selection service control system.

FIG. 3 is a diagram showing the internal arrangement of the route selection service control system 10. The route selection service control system 10 comprises a service control section 200, a communication control section 210, a terminal type data section 220, and a unit charge data section 230. The service control section 200 comprises a data processor (not shown in FIG. 3) which includes a CPU, RAM, ROM, I/O, etc., and the reading means 201, the position information acquiring means 202, the distance calculating means 203, the unit charge extracting means 204 and the selecting/notifying means 205, all shown in FIG. 1, are functions attained by the processing operation of the data processor.

The communication control section 210 performs communication interfacing with each of the service control nodes 11 and 12 and each of the transfer nodes 20 to 23 connected via the common communication network 40.

The terminal type data section 220 corresponds to the terminal type storing means 220a shown in FIG. 1, and the contents of data stored therein will be described with reference to FIG. 6. The unit charge data section 230 corresponds to the unit charge storing means 230a shown in FIG. 1, and the contents of data stored therein will be described with reference to FIGS. 7 and 8.

Figure 4:
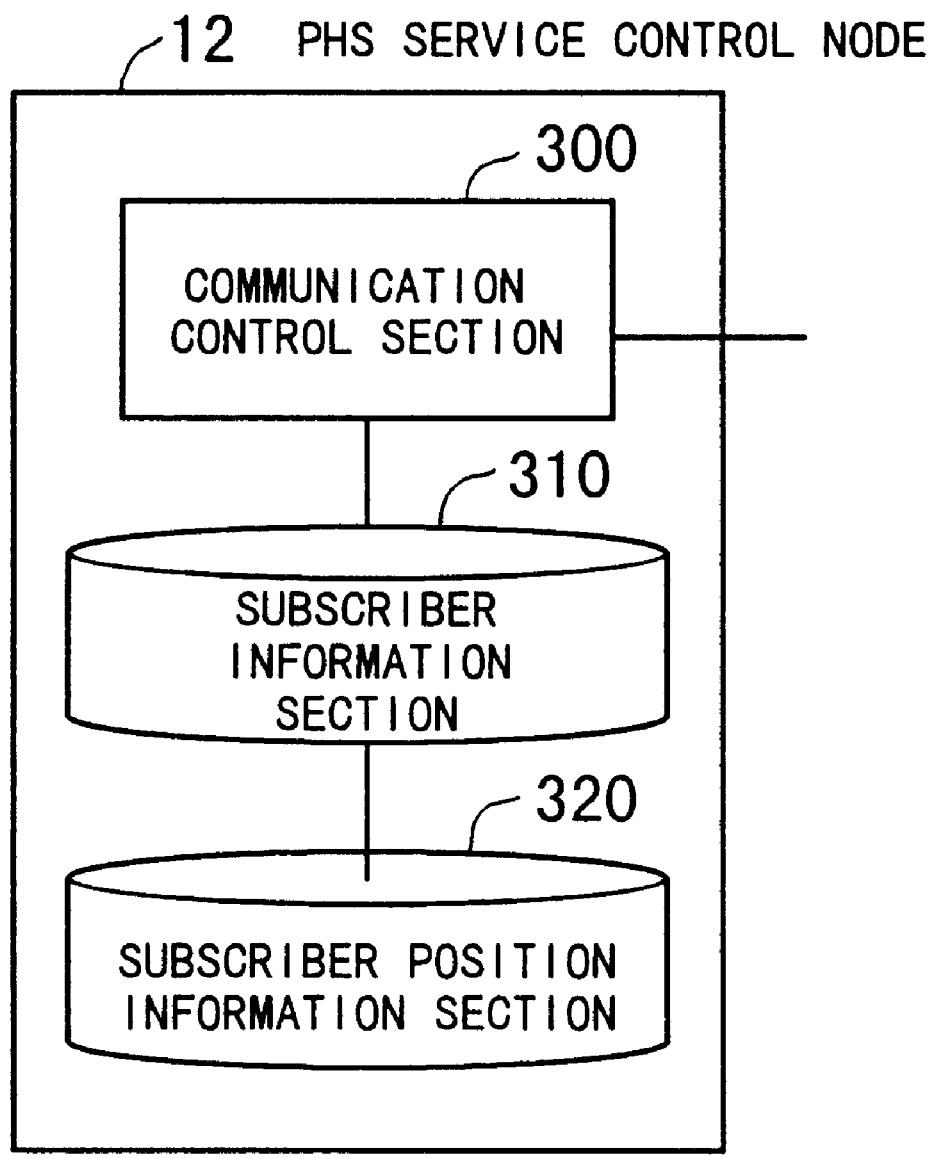
FIG. 4 is a diagram showing the internal arrangement of a PHS service control node.

FIG. 4 is a diagram showing the internal arrangement of the PHS service control node 12. The portable service control node 11 has the same arrangement as the PHS service control node 12, and therefore, description thereof is omitted.

The PHS service control node 12 comprises a communication control section 300, a subscriber information section 310, and a subscriber position information section 320. The communication control section 300 performs communication interfacing with the route selection service control system 10, the portable service control node 11 and the individual transfer nodes 20 to 23 connected via the common communication network 40.

The subscriber information section 310 stores information such as the terminal numbers of mobile terminals of all subscribers within the mobile communication network constituted by the PHS telephone service transfer node 22, the base stations 31 and 32, the mobile terminals 101, 111, etc. The subscriber position information section 320 stores position information indicative of current positions of the mobile terminals of all subscribers.

Figure 5:
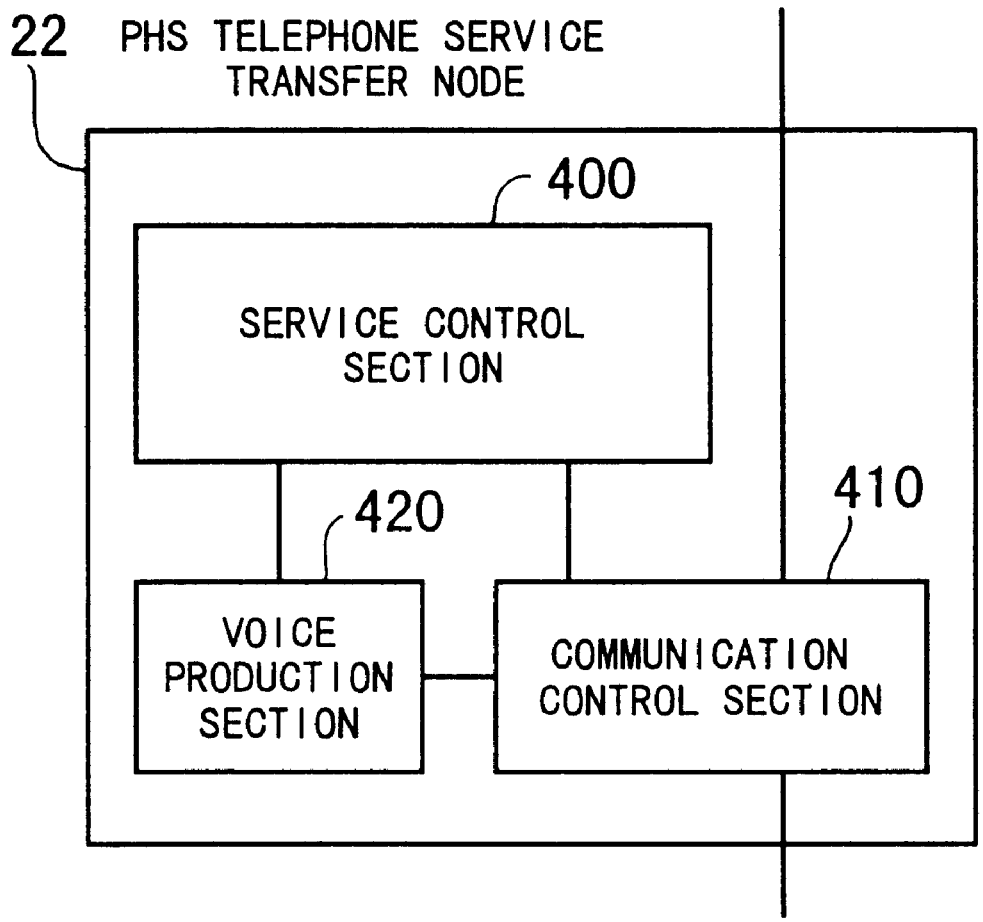
FIG. 5 is a diagram showing the internal arrangement of a PHS telephone service transfer node.

FIG. 5 is a diagram showing the internal arrangement of the PHS telephone service transfer node 22. The portable telephone service transfer node 20, the regular telephone service transfer node 21 and the different carrier's transfer node 23 also have the same arrangement as the PHS telephone service transfer node 22; therefore, description thereof is omitted.

The PHS telephone service transfer node 22 comprises a service control section 400, a communication control section 410, and a voice production section 420. The service control section 400 comprises a data processor (not shown in FIG. 5) including a CPU, RAM, ROM, I/O, etc., and carries out authentication of subscribers, a connection process for a call specifying a subscriber's identification number, etc., as described in detail later with reference to FIG. 11.

The communication control section 410 performs communication interfacing with the route selection service control system 10, the individual service control nodes 11 and 12 and the individual transfer nodes 20, 21 and 23 connected via the common communication network 40.

The voice production section 420 provides the terminals subordinate to the PHS telephone service transfer node 22 with a variety of voice guidance under the control of the service control section 400.

Figure 6:
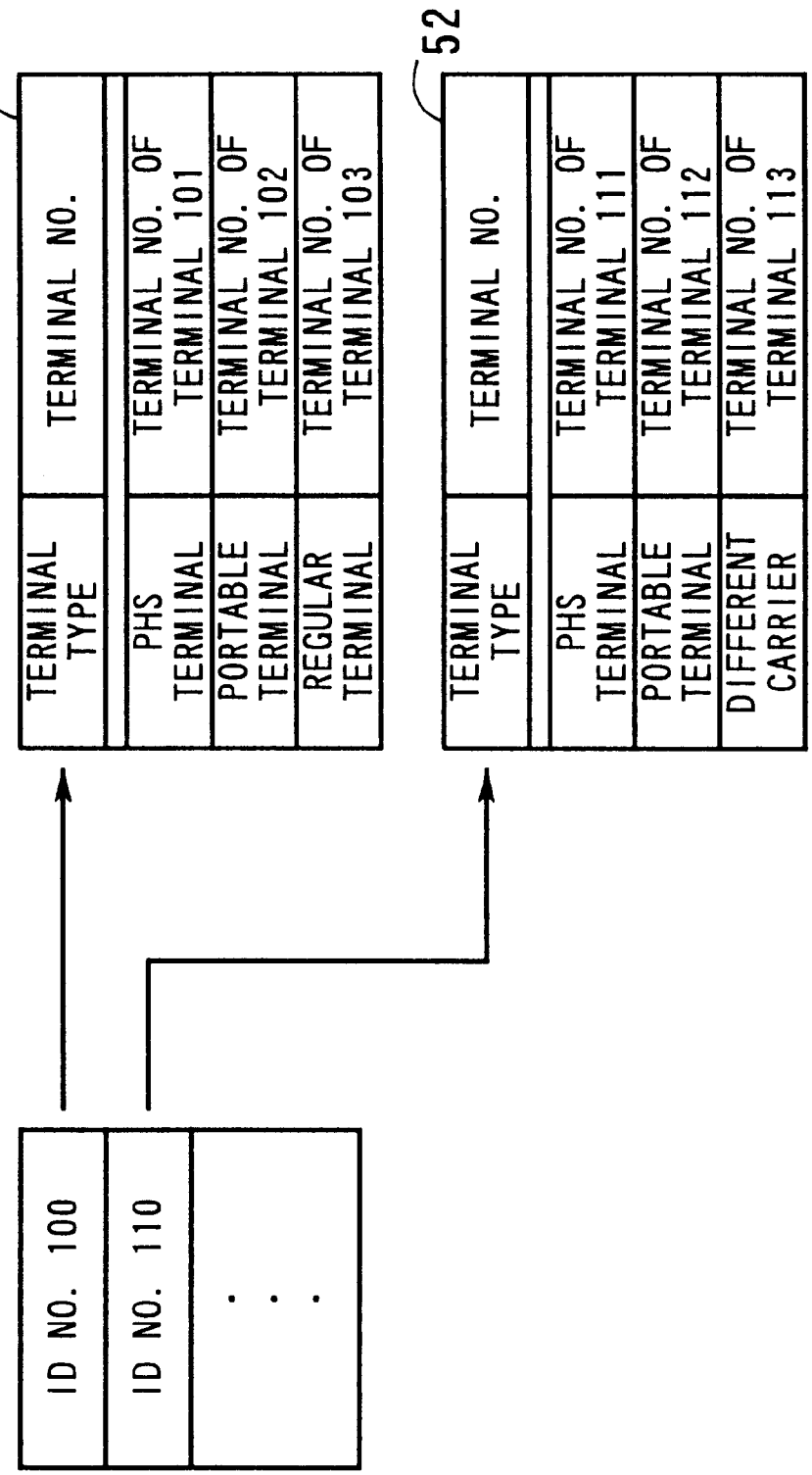
FIG. 6 is a diagram showing, by way of example, contents of data stored in a terminal type data section.

FIG. 6 is a diagram exemplifying contents of data stored in the terminal type data section 220. Specifically, an area is provided for each identification number assigned to a subscriber, and each area is provided with a "TERMINAL TYPE" field and a "TERMINAL NO." field. In the aforementioned example with reference to FIG. 2, for instance, since the subscriber with the identification number "100" owns the PHS mobile terminal 101, the portable mobile terminal 102 and the regular fixed terminal 103, the terminal numbers of the terminals 101, 102 and 103 are stored in order in the "TERMINAL NO." field of an area 51 corresponding to the identification number "100", and "PHS TERMINAL", "PORTABLE TERMINAL" and "REGULAR TERMINAL" are stored in order in the "TERMINAL TYPE" field. Similarly, the subscriber with the identification number "110" owns the PHS mobile terminal 111, the portable mobile terminal 112 and the fixed terminal 113 serviced by the different carrier; therefore, the terminal numbers of the terminals 111, 112 and 113 are stored in order in the "TERMINAL NO." field of an area 52 corresponding to the identification number "110", and "PHS TERMINAL", "PORTABLE TERMINAL" and "DIFFERENT CARRIER" are stored in order in the "TERMINAL TYPE" field.

FIG. 7 is a chart showing an example of a unit charge list which is part of data stored in the unit charge data section 230 and is used when the originating side is a PHS terminal. In the unit charge list are described unit charges for calls classified according to terminal types of terminating-side terminals, distances between terminals of originating and terminating sides, and time zones. The distance between originating- and terminating-side terminals is categorized as "INSIDE AREA", "OUTSIDE AREA A", "OUTSIDE AREA B", . . . , and the time zone is categorized as "WEEKDAY DAYTIME", "NIGHTTIME HOLIDAY", "LATE-NIGHT EARLY-MORNING", . . .

FIG. 8 is a chart showing an example of a unit charge list which is part of the data stored in the unit charge data section 230 and is used when the originating side is a portable terminal. In this list, unit charges are classified in the same manner as in FIG. 7.

The unit charge data section 230 also includes a unit charge list used where the originating side is a regular fixed terminal and a unit charge list used where the originating side is a fixed terminal serviced by the different carrier, but illustration of these lists is omitted.

Figure 9:
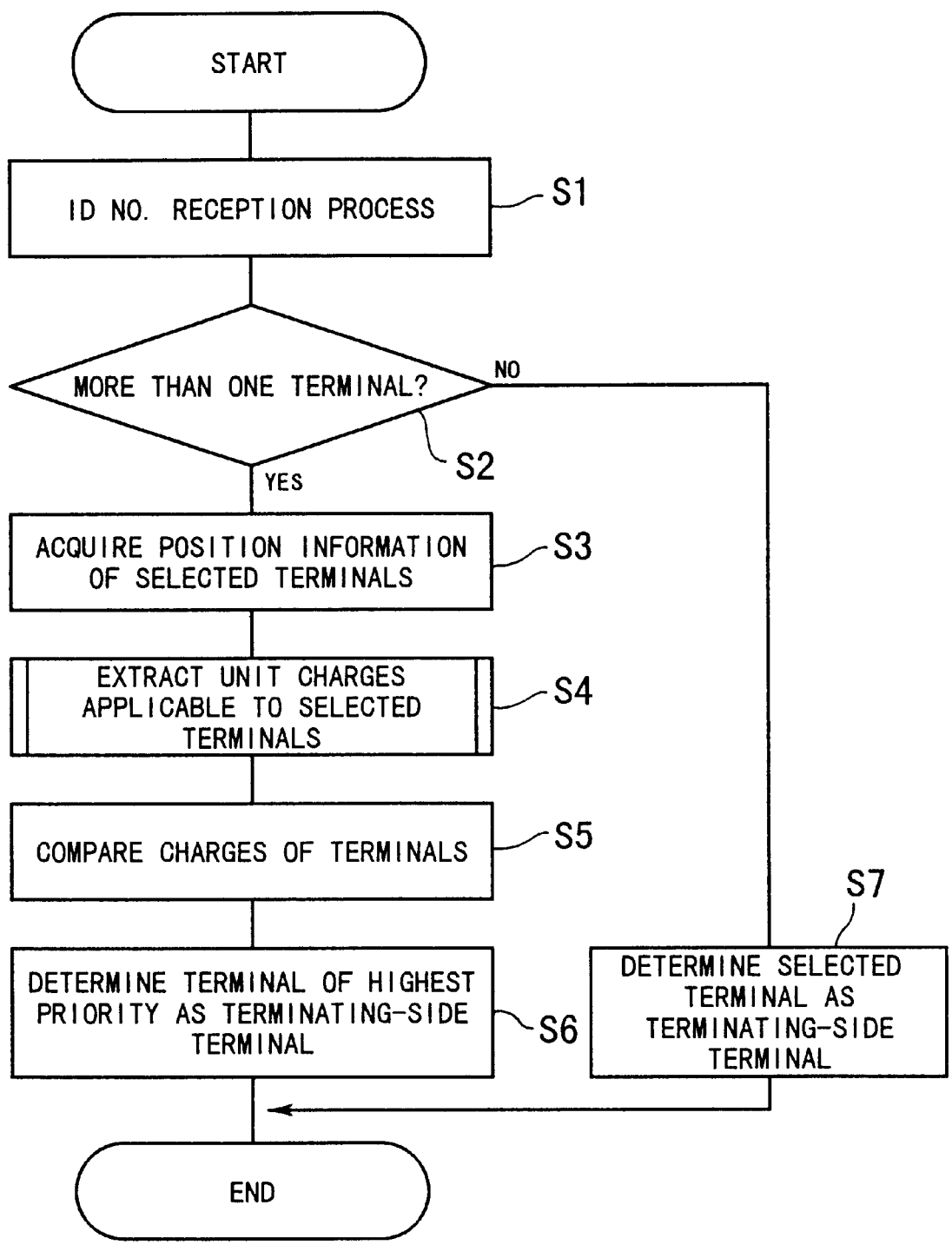
FIG. 9 is a flowchart showing a procedure for selecting a terminating-side terminal, executed in the route selection service control system.
Figure 10:
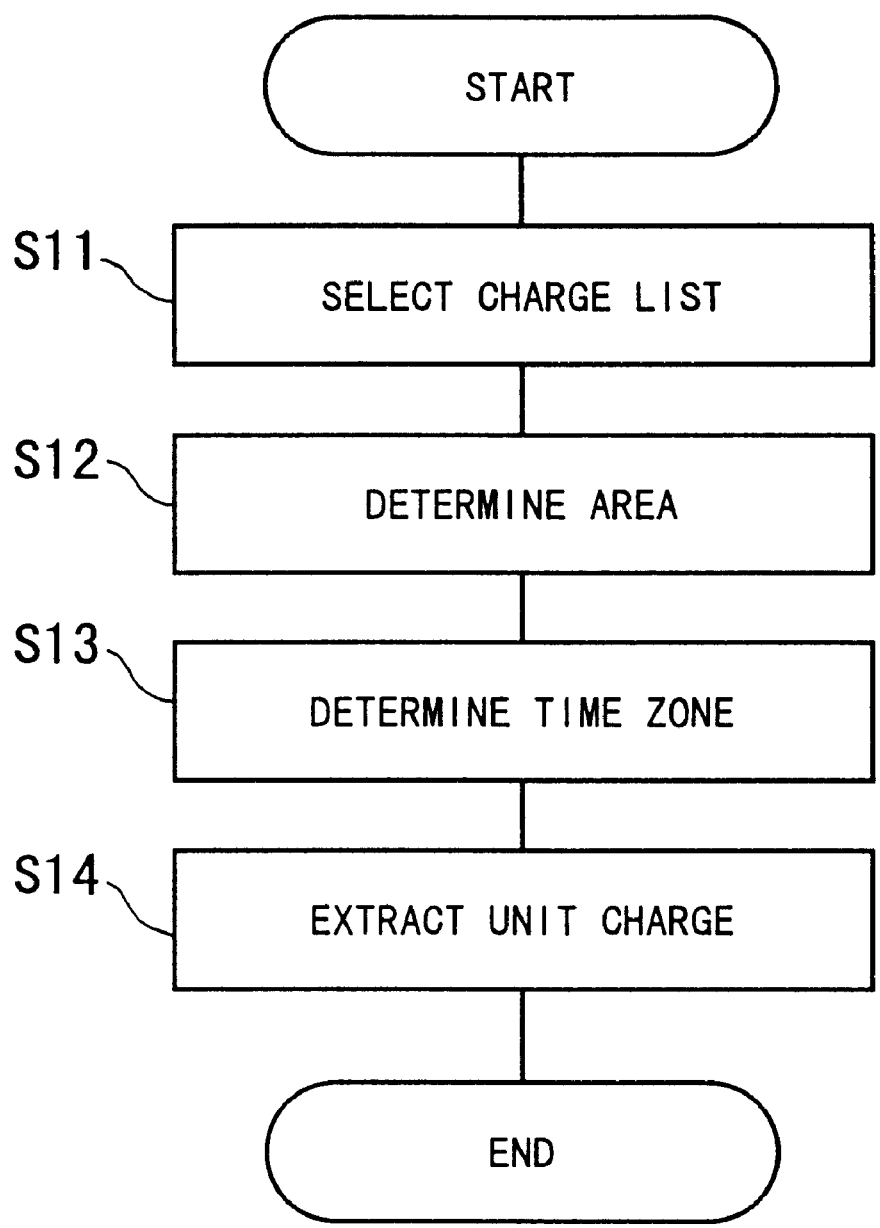
FIG. 10 is a flowchart showing details of Step S4 in FIG. 9.

FIGS. 9 and 10 are flowcharts showing a procedure for selecting a terminating-side terminal, executed in the route selection service control system 10. FIG. 9 shows an overall process flow and FIG. 10 shows details of Step S4 in FIG. 9. The process for selecting a terminating-side terminal will be explained with reference to FIG. 9 while referring to step numbers (S) in FIG. 10 where appropriate.

First, the route selection service control system 10 receives a subscriber's identification number from one of the transfer nodes 20 to 23. Thereupon, in the route selection service control system 10, the service control section 200 refers to the terminal type data section 220 to select and extract the terminal types and terminal numbers of terminals stored therein in association with the identification number (S1).

It is then determined whether or not the extracted information is related to a plurality of terminals (S2). Usually, the information shows a plurality of terminals, but depending on the setting, a single terminal may possibly be set. If the extracted information is related to a single terminal, this terminal is determined as the terminating-side terminal (S7).

On the other hand, where terminal types and terminal numbers associated with a plurality of terminals are extracted, the terminal numbers of those terminals whose terminal types are related to mobile communication (PHS or portable telephone) are set apart from others if included in the extracted information. Then, based on the terminal number of each of the terminals related to mobile communication, an inquiry is made to a corresponding one of the PHS service control node 12 and the portable service control node 11 in search of terminal position information, and current position information of the individual terminals is acquired (S3).

Subsequently, based on the terminal types and terminal numbers of the potential terminating-side terminals, extracted in Step S1, and the current position information of the terminals acquired in Step S3, reference is made to the unit charge data section 230 to extract unit charges (S4). The unit charges extracted in this case are unit charges applicable per predetermined unit time where a call is established between the originating-side terminal and each of the potential terminating-side terminals. Details of the process will be described later with reference to FIG. 10.

The extracted unit charges are then sorted in ascending order of charge, and the terminals are given priority in ascending order of charge (S5). The terminal of the highest priority is extracted and determined as the terminating-side terminal (S6).

Referring now to FIG. 10, details of Step S4 in FIG. 9 will be explained.

The service control section 200 acquires the terminal type of the originating-side terminal from the transfer node associated therewith, and then refers to the unit charge data section 230 to select a unit charge list corresponding to the terminal type of the originating-side terminal (S11). If the originating-side terminal is a terminal related to mobile communication, a process similar to Step S3 is performed in advance to obtain current position information of the originating-side terminal.

Subsequently, one of the potential terminating-side terminals extracted in Step S1 is selected. Based on the current position information of this terminal and the current position information of the originating-side terminal, the distance between the two terminals is obtained and an applicable "area" in the distance field of the unit charge list is identified (S12). In cases where the originating-side terminal or the potential terminating-side terminal is a fixed terminal, its current position information is obtained in advance from the transfer node associated with the terminal.

Then, based on the time of origination from the originating-side terminal, an applicable item in the time zone field of the unit charge list is determined (S13). Subsequently, based on the terminal type of the potential terminating-side terminal currently selected, a unit charge is extracted (S14).

Steps S12 to S14 are repeatedly executed thereafter for the remaining ones of the potential terminating-side terminals extracted in Step S1, though they are not shown in FIG. 10.

The process of route selection service will be now described with reference to an example of selective connection.

Figure 11:
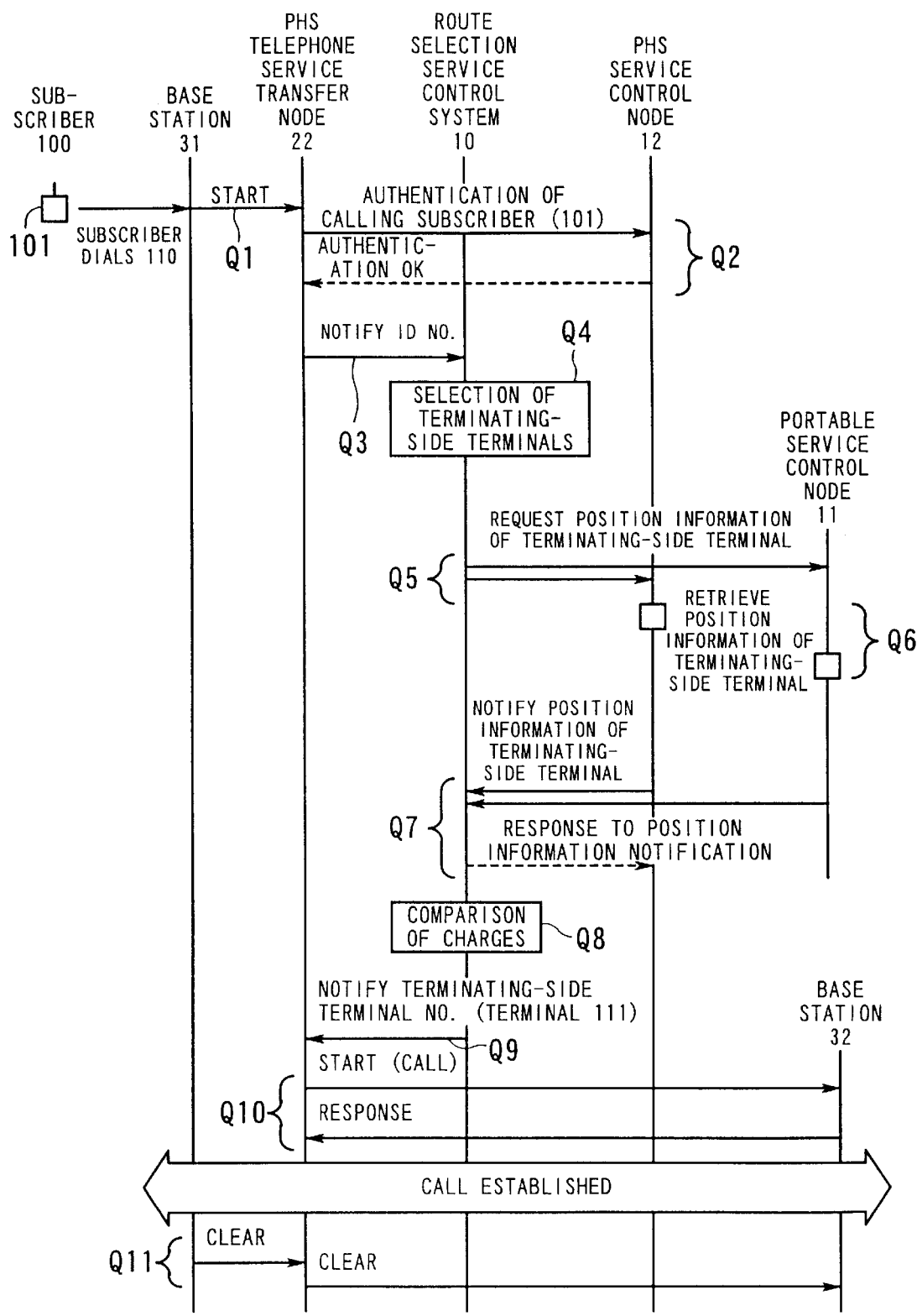
FIG. 11 is a sequence diagram illustrating a process flow of route selection service control according to the first embodiment.

FIG. 11 is a sequence diagram illustrating a flow of process performed when the subscriber with the identification number "100" makes a connection request to the subscriber with the identification number "110", with the use of the PHS terminal 101. In the following explanation, reference will be made to sequence numbers (Q) in FIG. 11 where appropriate.

Using the PHS terminal 101, the subscriber with the identification number "100" dials the identification number "110". On receiving the dialed number, the base station 31 judges from the identification number "110", that execution of the route selection service has been requested, and acquires the terminal type and terminal number of the PHS terminal 101. The base station 31 then notifies the PHS telephone service transfer node 22 of the identification number "110" as well as the terminal type and terminal number of the PHS terminal 101 (Q1).

The PHS telephone service transfer node 22 then transmits the terminal number of the PHS terminal 101 to the PHS service control node 12, to confirm that the call has been requested from the terminal of a registered subscriber (Q2).

After the authentication is completed, the PHS telephone service transfer node 22 transmits the identification number "110" to the route selection service control system 10 (Q3).

The route selection service control system 10 selects the terminals 111, 112 and 113 associated with the identification number "110" (Q4). With respect to the terminal 111 which is a mobile communication terminal among the selected terminals, the control system 10 seeks current position information from the PHS service control node 12 and is notified of the current position information on the terminal 111. Similarly, with respect to the terminal 112 which also is a mobile communication terminal, the control system 10 seeks current position information from the portable service control node 11 and is notified of the current position information on the terminal 112 (Q5, Q6, Q7).

The route selection service control system 10 then obtains the distance between the originating-side PHS terminal 101 and each of the potential terminating-side terminals 111, 112 and 113 based on the thus-acquired current position information on the terminals 111 and 112, the current position information on the fixed terminal 113, and the current position information on the originating-side PHS terminal 101. Subsequently, based on the obtained distances, the terminal types of the potential terminating-side terminals 111, 112 and 113, and the time of origination from the originating-side terminal 101, the route selection service control system 10 obtains unit charges for the respective terminating-side terminals 111, 112 and 113. For example, if "OUTSIDE AREA B" and "WEEKDAY DAYTIME" are found to be applicable in the list of FIG. 7 which is used in the case of the originating-side PHS terminal 101, "50 yen", "200 yen" and "90 yen" are obtained respectively as the unit charges for the PHS terminal 111, the portable terminal 112, and the terminal 113 serviced by the different carrier. Then, the terminal of which the unit charge is a minimum among the thus-obtained unit charges, that is, the terminal 111, is selected (Q8).

Subsequently, the route selection service control system 10 notifies the originating-side PHS telephone service transfer node 22 of the selected terminal 111 (Q9). The PHS telephone service transfer node 22 transmits a connection request to the base station 32 covering the terminal 111, to connect the terminal 101 to the terminal 111 (Q10).

Consequently, a call is established between the terminals 101 and 111, and when it is ended, a clearing process is executed (Q11).

In this manner, the least-cost route is automatically selected from among the routes connecting the originating-side terminal to each of terminals owned by an identical subscriber and connected to respective communication networks serviced by different telecommunication carriers.

In the first embodiment described above, unit charges classified according to the time zones are described in the unit charge data section 230. The condition for classification according to the time zones may, however, be removed, and in this case, the process can be simplified.

A second embodiment will be now described.

The second embodiment is basically identical in configuration with the first embodiment shown in FIGS. 2 to 5, and therefore, in the following description of the second embodiment, reference is made to the configuration of the first embodiment.

Figure 12:
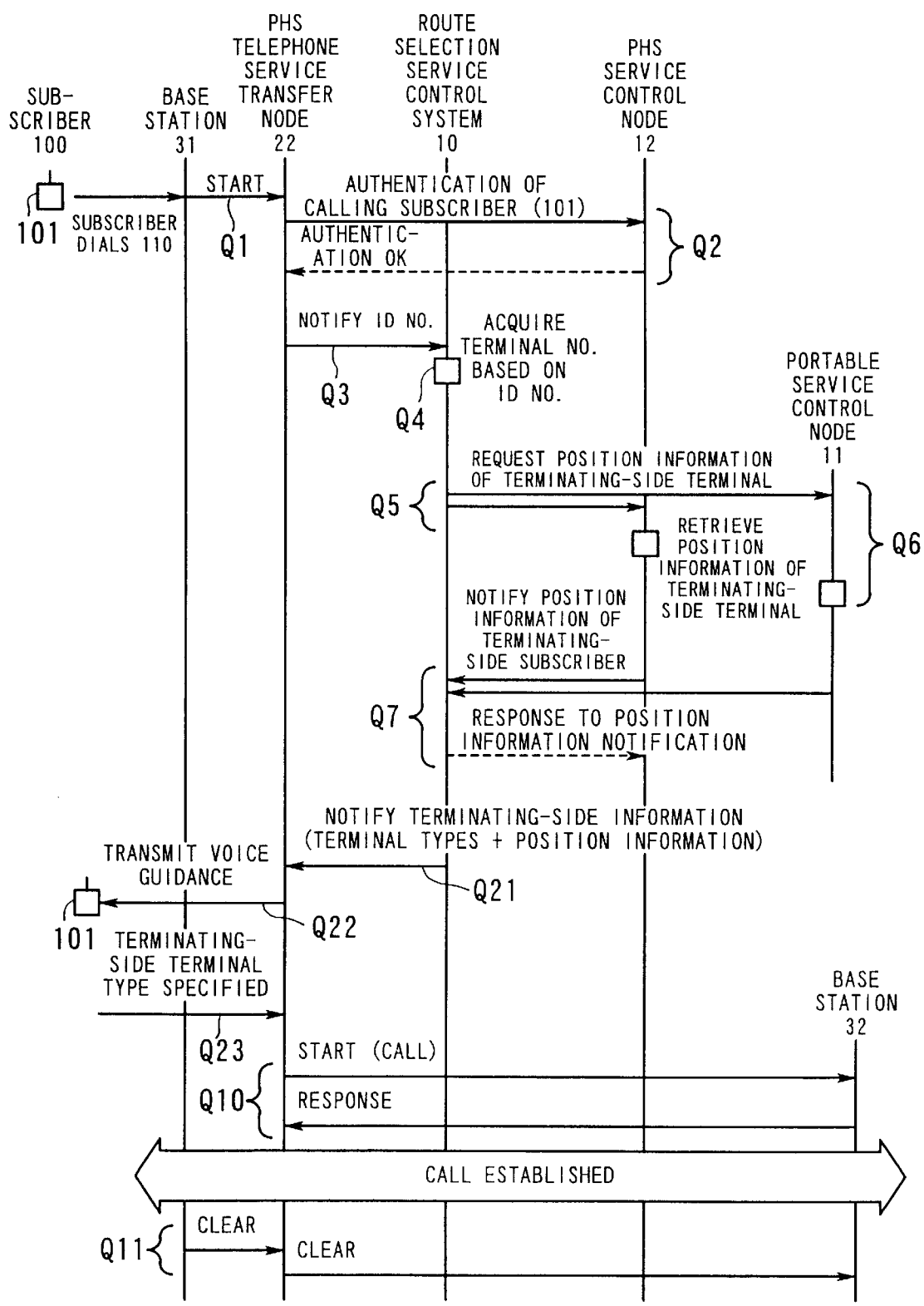
FIG. 12 is a sequence diagram illustrating a process flow of route selection service control according to a second embodiment.

FIG. 12 is a sequence diagram illustrating a process flow of route selection service control according to the second embodiment. The process flow of FIG. 12 also illustrates the case where the subscriber with the identification number "100" makes a connection request to the subscriber with the identification number "110" with the use of the PHS terminal 101. In FIG. 12, identical sequence numbers are used to denote processes identical with those of route selection service control according to the first embodiment shown in FIG. 11, and explanation of such processes is omitted.

In the second embodiment, after receiving the current position information on the potential terminating-side terminals 111 and 112 in sequence Q7, the route selection service control system 10 notifies the originating-side PHS telephone service transfer node 22 of the terminal types and position information of the individual terminals 111, 112 and 113 (Q21). In the PHS telephone service transfer node 22, the service control section 400 transmits voice guidance to the originating-side terminal 101 (Q22) with the use of the voice production section 420 (FIG. 5). Specifically, the terminal types and current positions of the respective potential terminating-side terminals are notified vocally, thereby prompting the subscriber to specify one of the terminals.

The subscriber with the identification number "100" specifies one terminal (e.g., the terminal 111) and thus the PHS telephone service transfer node 22 is notified of the specified terminal (Q23), whereupon the PHS telephone service transfer node 22 transmits a connection request to the base station 32 covering the terminal 111, to connect the terminal 101 to the terminal 111 (Q10).

In this manner, according to the second embodiment, a calling subscriber can select a desired route from among the routes connecting the originating-side terminal to each of terminals owned by an identical subscriber and connected to respective communication networks serviced by different carriers. This permits the calling subscriber to select an optimum route taking account of the positions of the terminals, transmission quality, etc.

Also in the second embodiment, the process up to sequence Q8 in the first embodiment in which the order of priority is determined may be executed so that the calling subscriber may be informed of the order of priority, instead of the position information, by voice guidance.

A third embodiment will be now described.

The third embodiment is basically identical in configuration with the first embodiment shown in FIGS. 2 to 5, and therefore, in the following description of the third embodiment, reference is made to the configuration of the first embodiment.

Figure 13:
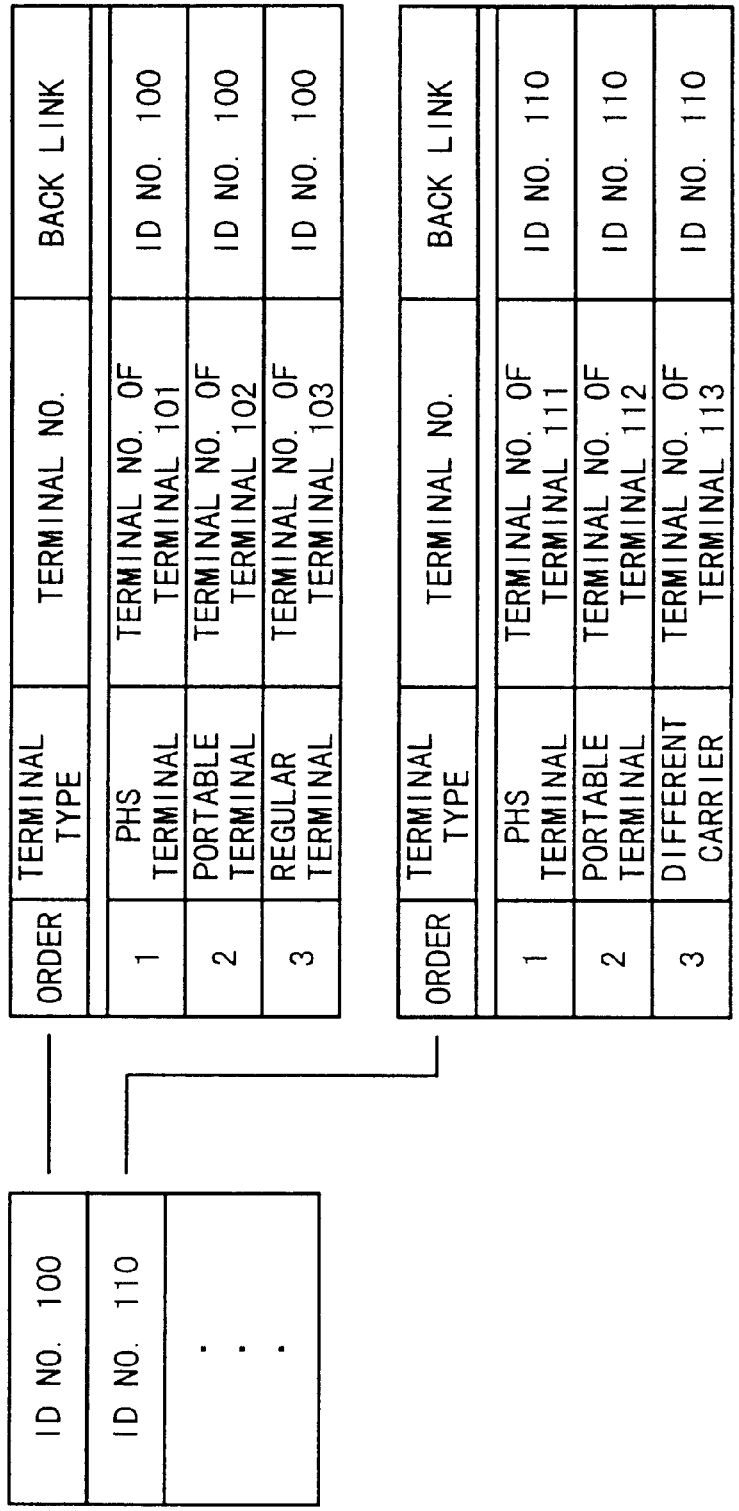
FIG. 13 is a chart showing contents of data stored in a terminal type data section of a route selection service control system according to a third embodiment.

FIG. 13 is a chart showing contents of data stored in the terminal type data section 220 of the route selection service control system 10 according to the third embodiment. In the third embodiment, there are additionally provided an "ORDER" field and a "BACK LINK" field. In the "ORDER" field is set the order of priority in which the terminating-side terminal to be connected to an originating-side terminal should be selected from among a plurality of potential terminating-side terminals. This setting can be changed by the subscriber who owns the terminals even after the order data is stored first in the terminal type data section 220. In the "BACK LINK" field, the identification number of the subscriber who owns the terminals is described.

Figure 14:
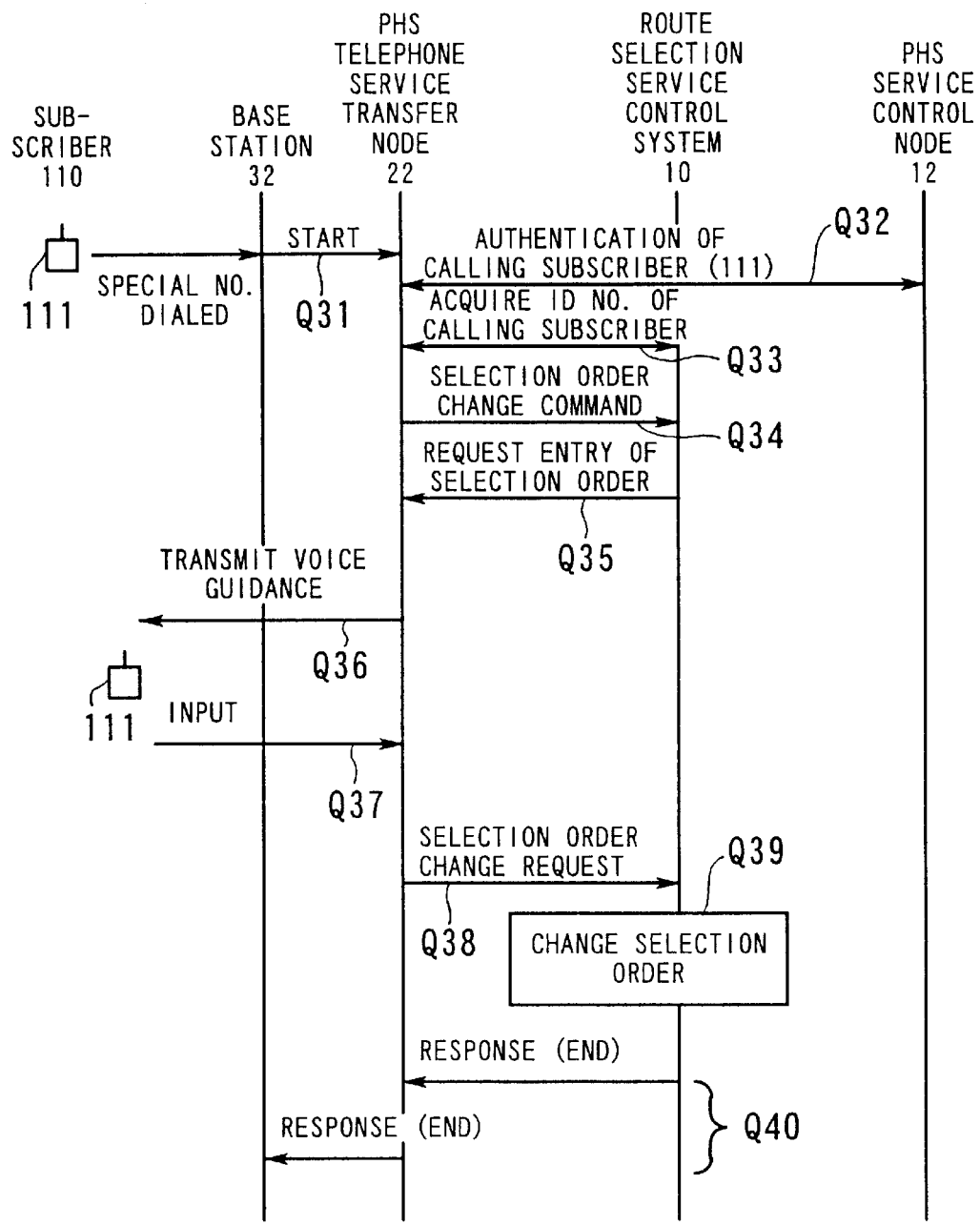
FIG. 14 is a sequence diagram illustrating a flow of process for changing the order of selection set in an "ORDER" field of the terminal type data section.

FIG. 14 is a sequence diagram illustrating a flow of process for changing the order of selection set in the "ORDER" field of the terminal type data section 220. In the following description of the process flow, reference will be made to sequence numbers (Q) in FIG. 14 where appropriate.

If the subscriber with the identification number "110", for example, desires to change the order of selection previously set in the terminal type data section with respect to his or her own terminals, he/she dials a special number with the use of the PHS terminal 111, for example. The special number indicates a request for change of the order of selection.

On receiving the request, the base station 32 judges from the special number that change of the order of selection has been requested, and acquires the terminal number of the PHS terminal 111. The base station then notifies the PHS telephone service transfer node 22 of the terminal number of the PHS terminal 111 (Q31).

The PHS telephone service transfer node 22 transmits the terminal number of the PHS terminal 111 to the PHS service control node 12, to confirm that the call has been made from a terminal of a registered subscriber (Q32).

After the authentication is completed, the PHS telephone service transfer node 22 transmits the terminal number of the PHS terminal 111 to the route selection service control system 10. In the route selection service control system 10, the terminal type data section 220 is searched for a part of the "TERMINAL NO." field where the terminal number of the PHS terminal 111 is described. If the terminal number is found, the identification number set in the corresponding "BACK LINK" field is read out and transmitted to the PHS telephone service transfer node 22 (Q33). In the illustrated case, the identification number "110" is read out.

The PHS telephone service transfer node 22 then transmits, together with the notified identification number "110", a selection order change command to the route selection service control system 10 (Q34). On receiving the command, the route selection service control system 10 reads out the terminal types of all terminals associated with the identification number "110" by referring to the terminal type data section 220, and transmits the read terminal types to the PHS telephone service transfer node 22 to request entry of order of selection (Q35).

In the PHS telephone service transfer node 22 which has thus been notified of the terminal types, the service control section 400 transmits voice guidance to the terminal 111 (Q36) with the use of the voice production section 420 (FIG. 5). Specifically, the subscriber is vocally informed of the terminal types of a plurality of terminals of which the order of selection may be changed, and is prompted to enter order of selection of the terminals.

The subscriber with the identification number "110" enters, for example, "1", "2" and "3" with respect to the PHS terminal, the portable terminal, and the terminal serviced by the different carrier, respectively, as order of selection (Q37). Thereupon, the PHS telephone service transfer node 22 is notified of the entered order of selection, and then transmits, together with the thus-notified information, a selection order change request to the route selection service control system 10 (Q38). The route selection service control system 10 changes the corresponding part in the "ORDER" field of the terminal type data section 220 (Q39). FIG. 13 shows the order of selection after the change.

Then, the route selection service control system 10 sends a response to the PHS telephone service transfer node 22 to inform that the change has been completed (Q40).

Thus, the change of the order of selection is completed.

A process flow of route selection service control according to the third embodiment, which uses the order of selection, will be now described.

Figure 15:
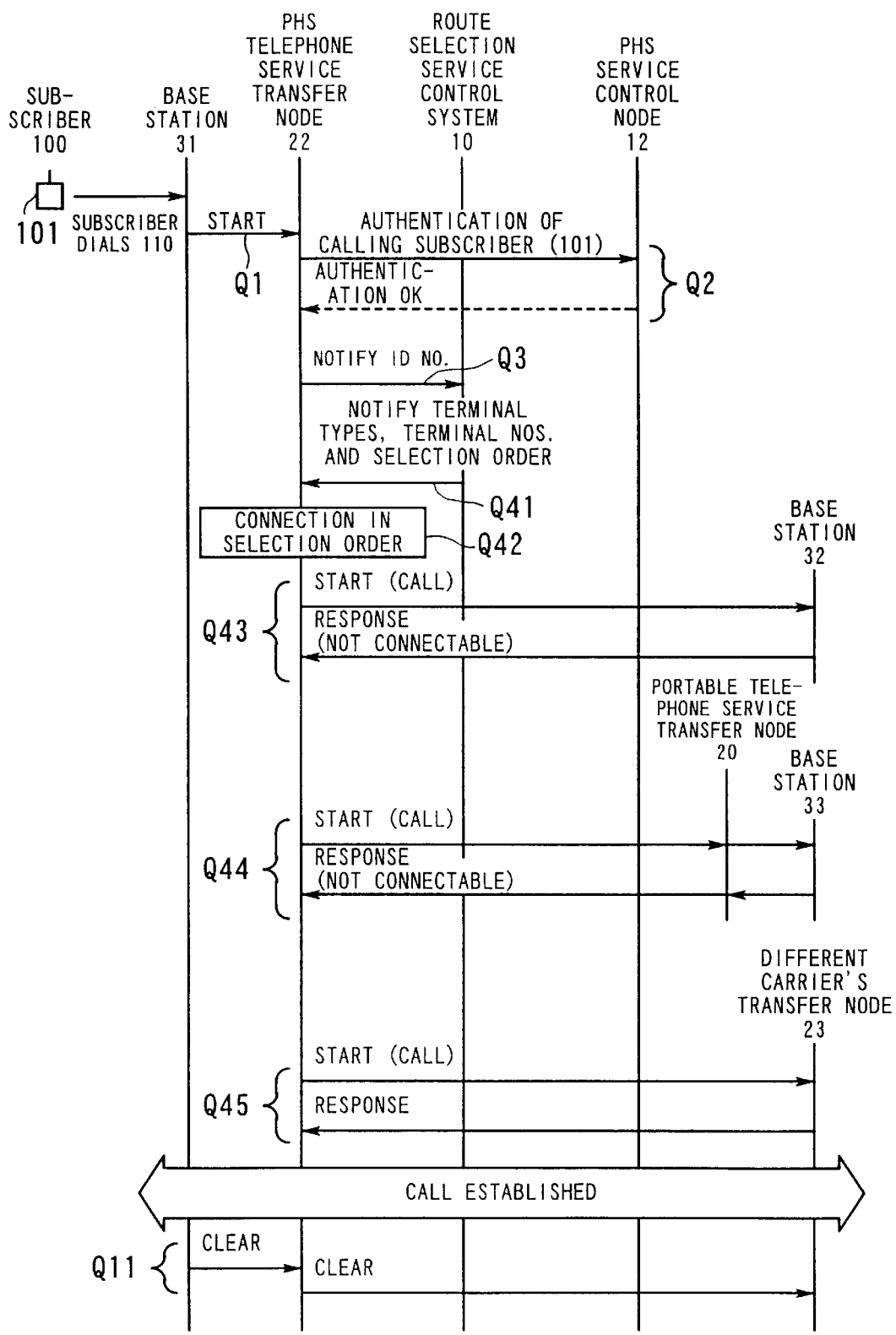
FIG. 15 is a sequence diagram illustrating a process flow of route selection service control according to the third embodiment.

FIG. 15 is a sequence diagram illustrating a process flow of route selection service control according to the third embodiment. The process flow of FIG. 15 also illustrates the case where the subscriber with the identification number "100" makes a connection request to the subscriber with the identification number "110" with the use of the PHS terminal 101. In FIG. 15, identical sequence numbers are used to denote processes identical with those of route selection service control according to the first embodiment shown in FIG. 11, and explanation of such processes is omitted.

In the third embodiment, after receiving the subscriber's identification number "110" in sequence Q3, the route selection service control system 10 reads out the terminal types, terminal numbers and order of selection of all terminals associated with the identification number "110" by referring to the terminal type data section 220, and notifies the PHS telephone service transfer node 22 of the read data (Q41).

The PHS telephone service transfer node 22 tries connection with the terminals in the order of selection (Q42). For example, the PHS telephone service transfer node 22 transmits a connection request to the base station 32 (Q43) so as to establish a connection with the PHS terminal 111 with the selection order "1". If the connection fails, the transfer node 22 transmits a connection request to the base station 33 via the portable telephone service transfer node 20 (Q44) so as to establish a connection with the portable terminal 112 with the selection order "2". If the connection fails again, the transfer node 22 transmits a connection request to the different carrier's transfer node 23 (Q45) so as to establish a connection with the terminal 113 with the selection order "3" which is serviced by the different carrier.

In this manner, according to the third embodiment, a terminating-side subscriber can set the order of priority of his or her terminals in which a call is to be preferentially received. Accordingly, when a subscriber is going out taking his/her mobile communication terminal with him/her, the selection order for the fixed terminal may conveniently be lowered.

In the third embodiment, the order of selection is changeable as shown in FIG. 14. Alternatively, the order of selection may be made unchangeable after once it is set, and in this case the procedure can be simplified.

Further, the third embodiment may be applied to the first embodiment. This prevents a connection from being established with a fixed terminal for which a call is charged less but which is answered by no one.

A fourth embodiment will be now described.

The fourth embodiment is basically identical in configuration with the first embodiment shown in FIGS. 2 to 5, and therefore, in the following description of the fourth embodiment, reference is made to the configuration of the first embodiment.

Figure 16:
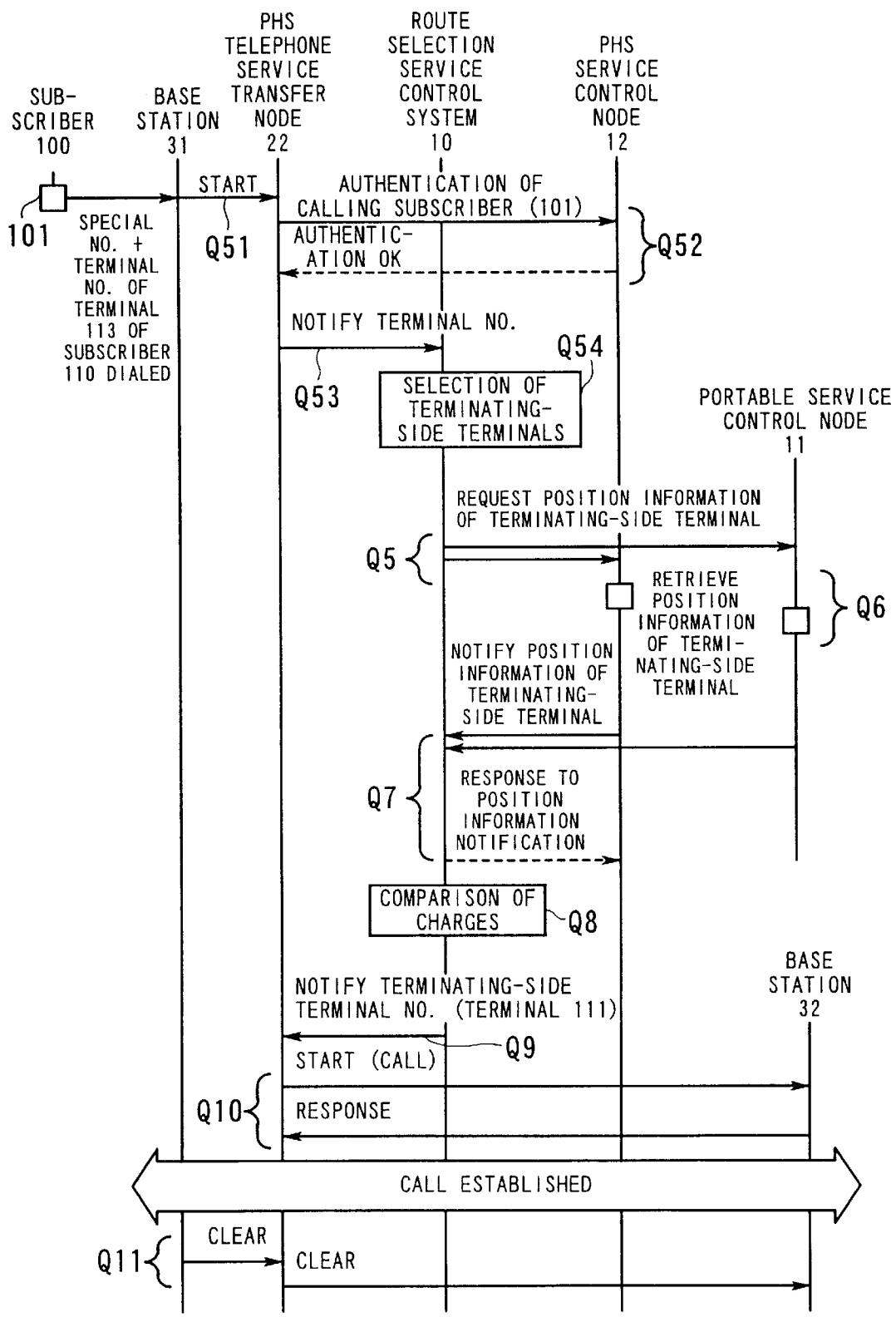
FIG. 16 is a sequence diagram illustrating a process flow of route selection service control according to a fourth embodiment.

FIG. 16 is a sequence diagram illustrating a process flow of route selection service control according to the fourth embodiment. In FIG. 16, identical sequence numbers are used to denote processes identical with those of route selection service control according to the first embodiment shown in FIG. 11, and explanation of such processes is omitted.

The fourth embodiment enables a calling party to utilize the route selection service by dialing a terminal number of a terminal even if he or she does not know the identification number of a terminating-side subscriber.

Specifically, the subscriber with the identification number "100" dials a special number and the terminal number of the terminal 113, for example, with the use of the PHS terminal 101. The special number is a number for requesting execution of the route selection service. On receiving the dialed numbers, the base station 31 judges from the special number that execution of the route selection service has been requested, and acquires the terminal number of the PHS terminal 101. The base station 31 then notifies the PHS telephone service transfer node 22 of the terminal number of the PHS terminal 101 (Q51).

The PHS telephone service transfer node 22 transmits the terminal number of the PHS terminal 101 to the PHS service control node 12, to confirm that the call has been received from a terminal of a registered subscriber (Q52).

After the authentication is completed, the PHS telephone service transfer node 22 transmits the terminal number of the terminating-side terminal 113 to the route selection service control system 10 (Q53).

In the route selection service control system 10, the terminal type data section 220 is searched for a part of the "TERMINAL NO." field in which the terminal number of the terminal 113 is described. Although it is not illustrated, a "BACK LINK" field as shown in FIG. 13 is additionally provided in the terminal type data section 220, but no "ORDER" field is provided.

If the terminal number is found, the identification number set in the corresponding "BACK LINK" field is obtained, and the terminal numbers of all terminals having the same identification number set in the "BACK LINK" field are read out (Q54).

The succeeding process is identical with that executed in the first embodiment.

Thus, in the fourth embodiment, a calling party can utilize the route selection service by merely dialing the special number and the terminal number of one of the terminals owned by the subscriber of terminating side, even if he or she does not know the identification number of the terminating-side subscriber.

In the fourth embodiment, the "BACK LINK" field is provided in the terminal type data section 220. Alternatively, the terminal numbers may be grouped by subscriber in the terminal type data section 220 so that, when a terminal number of a terminating-side terminal is received, reference may be made to the terminal type data section 220 to search for the group including the terminal number and to read out the terminal numbers of all terminals included in the group.

As described above, according to the present invention, a plurality of terminals owned by a subscriber are associated with the subscriber's identification number, and when the identification number of a terminating-side subscriber is received from a calling party, corresponding terminating-side terminals are identified. Then, unit charges applicable where a call is established between the originating-side terminal and the individual terminating-side terminals are calculated, and a terminating-side terminal that shows the least value is selected to establish a connection with the originating-side terminal.

Accordingly, it is possible to automatically select the least-cost route from among the routes connecting the originating-side terminal to each of the terminals owned by an identical subscriber and connected to respective communication networks serviced by different telecommunication carriers.

The calling party may alternatively be notified of the potential routes so that he or she can select a desired route. This permits the calling party to select an optimum route taking account of the positions of the terminals and the transmission quality.

Also, a subscriber of terminating side may be allowed to specify the order of priority of his or her own terminals in which a call is to be preferentially received. Thus, when the subscriber is going out taking his/her mobile communication terminal with him/her, the selection order for the fixed terminal may be lowered to prevent the fixed terminal from receiving calls unnecessarily.

Further, if a calling party dials the special number and the terminal number of one of terminals owned by a subscriber of terminating side, all terminals owned by the terminating-side subscriber are searched for, and among the terminals, an optimum terminating-side terminal is selected. Accordingly, the calling party can utilize the route selection service even if he or she does not know the identification number of the terminating-side subscriber.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention in the appended claims and their equivalents.

What is claimed is:

1. A route selection service control system provided in a common communication network to which are connected communication networks operated by a plurality of telecommunication carriers adopting different call charging systems, for selecting a specific route from among routes connecting an originating-side terminal to each of terminals owned by an identical subscriber and connected to respective communication networks operated by different carriers, said route selection service control system comprising:

terminal type storing means for storing an identification number of a subscriber and terminal types and terminal numbers of a plurality of terminals owned by the subscriber in a manner associated with one another;

unit charge storing means for storing, with respect to each terminal type of originating side, unit charges applicable to different terminal types of terminating side and to different distances between terminals of originating and terminating sides;

reading means for receiving an identification number of a terminating-side subscriber from an originating-side terminal, and reading out the terminal types and terminal numbers of a plurality of terminating-side terminals associated with the identification number of the subscriber by referring to said terminal type storing means;

position information acquiring means which, if the terminating-side terminals read out by said reading means include a mobile communication terminal, makes an inquiry to a position information management section associated with the terminal to obtain a current position of the terminal;

distance calculating means for calculating a distance between the current position of the terminating-side terminal obtained by said position information acquiring means and the position of the originating-side terminal;

unit charge extracting means for referring to said unit charge storing means to extract, with respect to each of the terminating-side terminals, a unit charge applicable to the terminal type of originating side, to the terminal type of terminating side read out by said reading means, and to the distance calculated by said distance calculating means; and selecting/notifying means for selecting a terminating-side terminal which shows a minimum value among the unit charges extracted by said unit charge extracting means and associated with the respective terminating-side terminals, and notifying an originating-side communication network of the terminal number of the selected terminal.

2. The route selection service control system according to claim 1, wherein said unit charge storing means stores, with respect to each terminal type of originating side, unit charges applicable to different terminal types of terminating side, to different distances between terminals of originating and terminating sides, and to different time zones, and said unit charge extracting means refers to said unit charge storing means to extract, with respect to each of the terminating-side terminals, a unit charge applicable to the terminal type of originating side, to the terminal type of terminating side read out by said reading means, to the distance calculated by said distance calculating means, and to a time of origination.

3. A route selection service control system provided in a common communication network to which are connected communication networks operated by a plurality of telecommunication carriers adopting different call charging systems, for selecting a specific route from among routes connecting an originating-side terminal to each of terminals owned by an identical subscriber and connected to respective communication networks operated by different carriers, said route selection service control system comprising:

terminal type storing means for storing an identification number of a subscriber and terminal types and terminal numbers of a plurality of terminals owned by the subscriber in a manner associated with one another;

reading means for receiving an identification number of a terminating-side subscriber from an originating-side terminal, and reading out the terminal types and terminal numbers of a plurality of terminating-side terminals associated with the identification number of the subscriber by referring to said terminal type storing means;

position information acquiring means which, if the terminating-side terminals read out by said reading means include a mobile communication terminal, makes an inquiry to a position information management section associated with the terminal to obtain a current position of the terminal;

notifying means for notifying an originating-side communication network of the terminal types and terminal numbers of said plurality of terminating-side terminals read out by said reading means and the current position of the terminating-side terminal obtained by said position information acquiring means; and terminating-side information providing means provided in the originating-side communication network, for providing the information notified by said notifying means to the originating-side terminal to request selection of one of the terminating-side terminals.

4. A route selection service control system provided in a common communication network to which are connected communication networks operated by a plurality of telecommunication carriers adopting different call charging systems, for selecting a specific route from among routes connecting an originating-side terminal to each of terminals owned by an identical subscriber and connected to respective communication networks operated by different carriers, said route selection service control system comprising:

terminal type storing means for storing an identification number of a subscriber and terminal types, terminal numbers and order of selection of a plurality of terminals owned by the subscriber in a manner associated with one another;

reading means for receiving an identification number of a terminating-side subscriber from an originating-side terminal, and reading out the terminal types, terminal numbers and order of selection of a plurality of terminating-side terminals associated with the identification number of the subscriber by referring to said terminal type storing means;

terminating-side information providing means for providing the information read out by said reading means to an originating-side communication network; and connecting means provided in the originating-side communication network, for successively trying connection with the terminating-side terminals in the order of selection based on the information provided by said terminating-side information providing means.

5. The route selection service control system according to claim 4, further comprising selection order changing means for changing the order of selection stored in said terminal type storing means in response to a change request sent from a subscriber via a terminal.

6. A route selection service control system provided in a common communication network to which are connected communication networks operated by a plurality of telecommunication carriers adopting different call charging systems, for selecting a specific route from among routes connecting an originating-side terminal to each of terminals owned by an identical subscriber and connected to respective communication networks operated by different carriers, said route selection service control system comprising:

terminal type storing means for storing terminal types and terminal numbers of terminals owned by each identical subscriber and connected to respective communication networks operated by different carriers in a manner such that the terminal types and the terminal numbers are grouped by subscriber;

unit charge storing means for storing, with respect to each terminal type of originating side, unit charges applicable to different terminal types of terminating side and to different distances between terminals of originating and terminating sides;

reading means which, on receiving a signal indicative of request for execution of route selection service and a terminal number of a terminating-side terminal from an originating-side terminal, finds a group including the terminal number by referring to said terminal type storing means and reads out the terminal types and terminal numbers of all terminals included in the group;

position information acquiring means which, if the terminating-side terminals read out by said reading means include a mobile communication terminal, makes an inquiry to a position information management section associated with the terminal to obtain a current position of the terminal;

distance calculating means for calculating a distance between the current position of the terminating-side terminal obtained by said position information acquiring means and the position of the originating-side terminal;

unit charge extracting means for referring to said unit charge storing means to extract, with respect to each of the terminating-side terminals, a unit charge applicable to the terminal type of originating side, to the terminal type of terminating side read out by said reading means, and to the distance calculated by said distance calculating means; and selecting/notifying means for selecting a terminating-side terminal which shows a minimum value among the unit charges extracted by said unit charge extracting means and associated with the respective terminating-side terminals, and notifying an originating-side communication network of the terminal number of the selected terminal.

\* \* \* \* \*